United States Patent
Zhang et al.

(10) Patent No.: US 12,327,332 B2
(45) Date of Patent: Jun. 10, 2025

(54) MULTI-MODALITY IMAGE PROCESSING METHOD AND DEVICE

(71) Applicant: Lenovo (Beijing) Limited, Beijing (CN)

(72) Inventors: Yao Zhang, Beijing (CN); Jiang Tian, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 526 days.

(21) Appl. No.: 17/686,395

(22) Filed: Mar. 3, 2022

(65) Prior Publication Data

US 2023/0103262 A1   Mar. 30, 2023

(30) Foreign Application Priority Data

Sep. 29, 2021   (CN) .......................... 202111154668.8

(51) Int. Cl.
| | |
|---|---|
| *G06T 5/50* | (2006.01) |
| *G06F 18/214* | (2023.01) |
| *G06F 18/22* | (2023.01) |
| *G06F 18/25* | (2023.01) |
| *G06V 10/40* | (2022.01) |

(52) U.S. Cl.
CPC .............. *G06T 5/50* (2013.01); *G06F 18/214* (2023.01); *G06F 18/22* (2023.01); *G06F 18/251* (2023.01); *G06F 18/253* (2023.01); *G06V 10/40* (2022.01); *G06T 2207/10081* (2013.01); *G06T 2207/20081* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2018/0365834 | A1* | 12/2018 | Li | ............................. G06N 3/08 |
| 2020/0349414 | A1* | 11/2020 | Bazhenov | ............. G06F 18/256 |
| 2021/0056684 | A1* | 2/2021 | Zhou | ..................... G06V 10/82 |

FOREIGN PATENT DOCUMENTS

| | | | | | |
|---|---|---|---|---|---|
| CN | 104835112 | A | * | 8/2015 | |
| CN | 109961443 | A | * | 7/2019 | |
| CN | 112651960 | A | * | 4/2021 | ........... G06F 18/214 |

OTHER PUBLICATIONS

Gupta, Itisha, and Garima Nagpal. Artificial Intelligence and Expert Systems. 1st ed. Dulles, Virginia; Mercury Learning and Information, 2020. Print. (Year: 2020).*

* cited by examiner

*Primary Examiner* — Amandeep Saini
*Assistant Examiner* — Caroline Tabancay Duffy
(74) *Attorney, Agent, or Firm* — ANOVA LAW GROUP, PLLC

(57) ABSTRACT

An image processing method includes obtaining a first quantity of to-be-analyzed images and performing fusion and enhancement processing on the first quantity of to-be-analyzed images through an image analysis model to obtain a first target image. Each to-be-analyzed image corresponds to a different target modality of a target imaging object. The first target image is used to enhance display of a distribution area of an analysis object of the first quantity of to-be-analyzed images. The analysis object belongs to the imaging object. The image analysis model is obtained by training a second quantity of sample images corresponding to different sample modalities. The first quantity is less than or equal to the second quantity. The target modality belongs to the sample modalities.

18 Claims, 6 Drawing Sheets

MULTI-MODALITY IMAGE PROCESSING METHOD AND DEVICE

CROSS-REFERENCE TO RELATED APPLICATION

This application claims priority to Chinese Patent Application No. 202111154668.8, filed on Sep. 29, 2021, the entire content of which is incorporated herein by reference.

TECHNICAL FIELD

The present disclosure generally relates to the image processing technology field and, more particularly, to an image processing method and device.

BACKGROUND

With the rapid development of computer graphics and image processing technology, computers have been widely used in the medical field. Through analysis processing of various diagnostic images by computers, accurate diagnosis efficiency of medical staff is improved. Currently, commonly used computer-aided diagnosis systems usually perform corresponding enhancement processing on magnetic resonance imaging (MRI) or computed tomography (CT) images so that doctors can quickly determine locations of lesions. For example, when a current computer-aided diagnosis system determines a hepatic tumor, a dual-modal scheme is usually used to realize the diagnosis. That is, an enhanced CT image when contrast agent is in the hepatic vein and a CT image when contrast agent is in the hepatic artery are collected for a period of time for analysis. Since the enhanced CT image when the contrast agent is in the hepatic vein and the CT image when the contrast agent is in the hepatic artery can complement information with each other well, which helps to better diagnose the hepatic tumor.

However, if only one modal image information or more than 2 types of modal image information are available, the above-mentioned dual-modal solution cannot be used to perform image processing. A new corresponding image processing method needs to be redeveloped, which causes the current image processing method to be less efficient.

SUMMARY

Embodiments of the present disclosure provide an image processing method. The method includes obtaining a first quantity of to-be-analyzed images that need to be analyzed and performing fusion and enhancement processing on the first quantity of to-be-analyzed images that need to be analyzed through an image analysis model to obtain a first target image. Each to-be-analyzed image corresponds to a different target modality of a target imaging object. The first target image is used to enhance display of a distribution area of an analysis object of the first quantity of to-be-analyzed images. The analysis object belongs to the imaging object. The image analysis model is obtained by training a second quantity of sample images corresponding to different sample modalities. The first quantity is less than or equal to the second quantity. The target modality belongs to the sample modalities.

Embodiments of the present disclosure provide an image processing device, including an acquisition unit and a model processing unit. The acquisition unit is configured to obtain a first quantity of to-be-analyzed images. Each to-be-analyzed image corresponds to a different target modality of a target imaging object. The model processing unit is configured to perform fusion and enhancement processing on the first quantity of to-be-analyzed images through an image analysis model to obtain a first target image. The first target image is used to enhance display of a distribution area of an analysis object of the first quantity of to-be-analyzed images. The analysis object belongs to the imaging object. The image analysis model is obtained by training a second quantity of sample images corresponding to different sample modalities. The first quantity is less than or equal to the second quantity. The target modality belongs to the sample modalities.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

The technical solutions of embodiments of the present disclosure are described in detail below with reference to the accompanying drawings of embodiments of the present disclosure.

Figure 1:
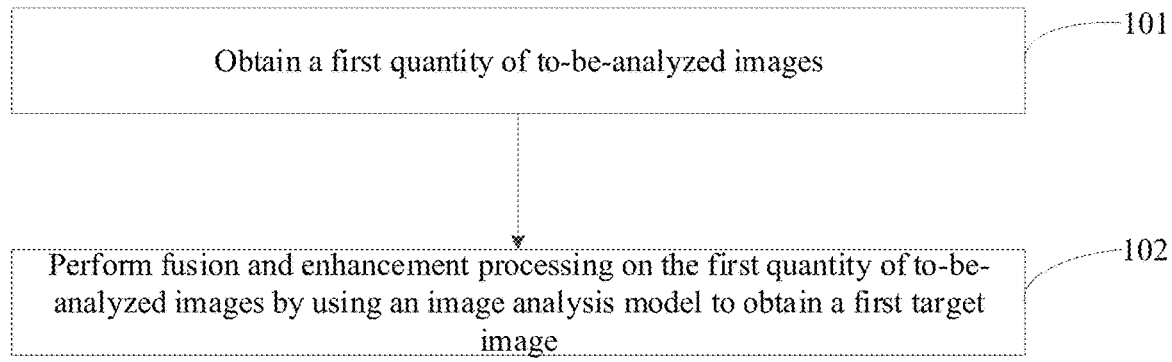
FIG. 1 illustrates a schematic flowchart of an image processing method according to some embodiments of the present disclosure.

Embodiments of the present disclosure provide an image processing method. Referring to FIG. 1, the method is applied to an electronic device. The method includes the following steps.

At 101, a first quantity of images that need to be analyzed (i.e., to-be-analyzed images) are obtained.

Each image that needs to be analyzed corresponds to a different target model of a target imaging object.

In embodiments of the present disclosure, the electronic device is a device with computation and analysis capabilities, for example, a computer device, a server device, a smart mobile device, etc. The first quantity of images that need to be analyzed may include images that are obtained by using different imaging methods for the same target object and need to be analyzed. That is, one image that needs to be analyzed corresponds to one modality. As such, the first quantity of images that need to be analyzed correspond to a first quantity of modalities. The image that needs to be analyzed to may be an image that needs to be analyzed in various fields, for example, an image that needs to be enhanced and displayed in an area where an analysis object is located in the medical field.

In some embodiments, an image of a patient liver may be collected in a computed tomography (CT) method to obtain a venous phase image of contrast agent in the vein and an arterial phase image of contrast agent in the artery. The venous phase image and the arterial phase image may be called images of two modalities. The images of the liver of the same patient may also be collected in the CT method.

At 102, fusion and enhancement processing is performed on the first quantity of images that need to be analyzed by using an image analysis model to obtain a first target image.

The first target image may be used to enhance display of a distribution area of the analysis object in the first quantity of images that need to be analyzed. The analysis object may be an imaging object. The image analysis model may be obtained by training a second quantity of sample images corresponding to different sample modalities. The first quantity may be less than or equal to the second quantity. The target modality may be a sample modality.

In embodiments of the present disclosure, the image analysis model may be an analysis model obtained by training a large quantity of sample images, including a second quantity of different sample modalities. During an analysis process, input objects with the most quantity of the image analysis model may be the images that need to be analyzed of the second quantity of different sample modalities, and at least images that need to be analyzed of one sample modality. Since the image analysis model is obtained by training according to a large number of sample images, including the second quantity of different sample modalities, parameters corresponding to each sample modality in the image analysis model may be determined by other sample modalities. Thus, the image analysis model may supplement features of other sample modalities. As such, when the first quantity of images that need to be analyzed input is less than the second quantity, the image analysis model can also supplement feature information of missing sample modalities. The image analysis modal may perform the fusion and enhancement processing on the first quantity of images that need to be analyzed to obtain the first target image.

Embodiments of the present disclosure provide an image processing method. After obtaining the first quantity of images that need to be analyzed, the method further includes performing the fusion and enhancement processing on the first quantity of images that need to be analyzed through the image analysis model to obtain the first target image. As such, since the first quantity may be less than the second quantity of all inputs of the image analysis model, the image analysis model may perform the fusion and enhancement processing on the first quantity of images that need to be analyzed of the missing modalities to obtain the first target for the analysis object. The problem that the current image processing method cannot realize image analysis when the modality is missing may be solved. Thus, when the modality is missing, the unified image processing method may still be used for analysis, which improves the processing efficiency of the graphic processing method.

Based on the above embodiments, embodiments of the present disclosure provide an image processing method. The method is applied to an electronic device. The method includes the following steps.

At 201, a first quantity of images that need to be analyzed are obtained.

Each image that needs to be analyzed corresponds to a different target modality of a target imaging object.

In embodiments of the present disclosure, for example, the images that need to be analyzed may include a hepatic CT image collected in a CT manner. A first quantity of hepatic CT images that need to be analyzed may be currently collected to obtain the first quantity of images that need to be analyzed.

At 202, fusion and enhancement processing is performed on the first quantity of images that need to be analyzed by using the image analysis model to obtain a first target image.

The first target image may be used to enhance the display of a distribution area of the analysis object in the first quantity of images that need to be analyzed. The analysis object may be an imaging object. The image analysis model may be obtained by training a second quantity of sample images corresponding to different sample modalities. The first quantity may be less than or equal to the second quantity. The target modality may be a sample modality.

In embodiments of the present disclosure, the corresponding image analysis model may include a model that meets the requirements and is obtained by performing model training with a large quantity of hepatic CT images, including the second quantity of hepatic CT images. Assuming that the second quantity is 2, the corresponding two sample modalities may be the arterial phase hepatic CT image modality and the venous phase hepatic CT image modality, respectively. Thus, the first quantity may be 1 or 2, which is usually determined by a quantity of images of a collected sample modality.

Both the first quantity and the second quantity may be determined by actual application scenes, which are not limited here.

Figure 2:
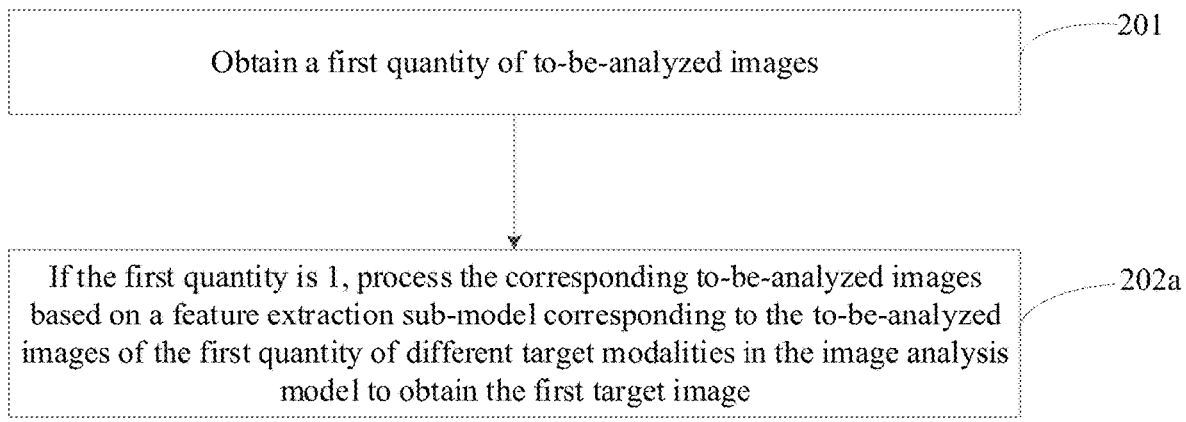
FIG. 2 illustrates a schematic flowchart of another image processing method according to some embodiments of the present disclosure.

Based on the above embodiments, in other embodiments of the present disclosure, referring to FIG. 2, step 202a may include, if the first quantity is 1, processing the corresponding images that need to be analyzed based on a feature extraction sub-model corresponding to the first quantity of images that need to be analyzed of different target modalities in the image analysis model to obtain the first target image.

The feature extraction sub-model corresponding to each image that needs to be analyzed may represent a relationship between the images that need to be analyzed of the second quantity of different sample modalities.

In embodiments of the present disclosure, when the first quantity is 1, a feature extraction sub-model corresponding to a target modality of one obtained image that needs to be analyzed may be determined from the image analysis model. The determined and obtained feature extraction sub-model may be used to perform image feature extraction processing on the one image that needs to be analyzed to obtain the first target image.

Since the image analysis model is obtained by performing model training according to a large quantity of sample images including the second quantity of sample modalities, relevant parameters in the feature extraction sub-model of each sample modality may not only include sample modal information of the sample modality but also learn sample modal information of other sample modalities. As such, when the image analysis model is used to analyze the image that needs to be analyzed of a target modality, an effect when the images that need to be analyzed of the second quantity of sample modalities may be approximately achieved.

Figure 3:
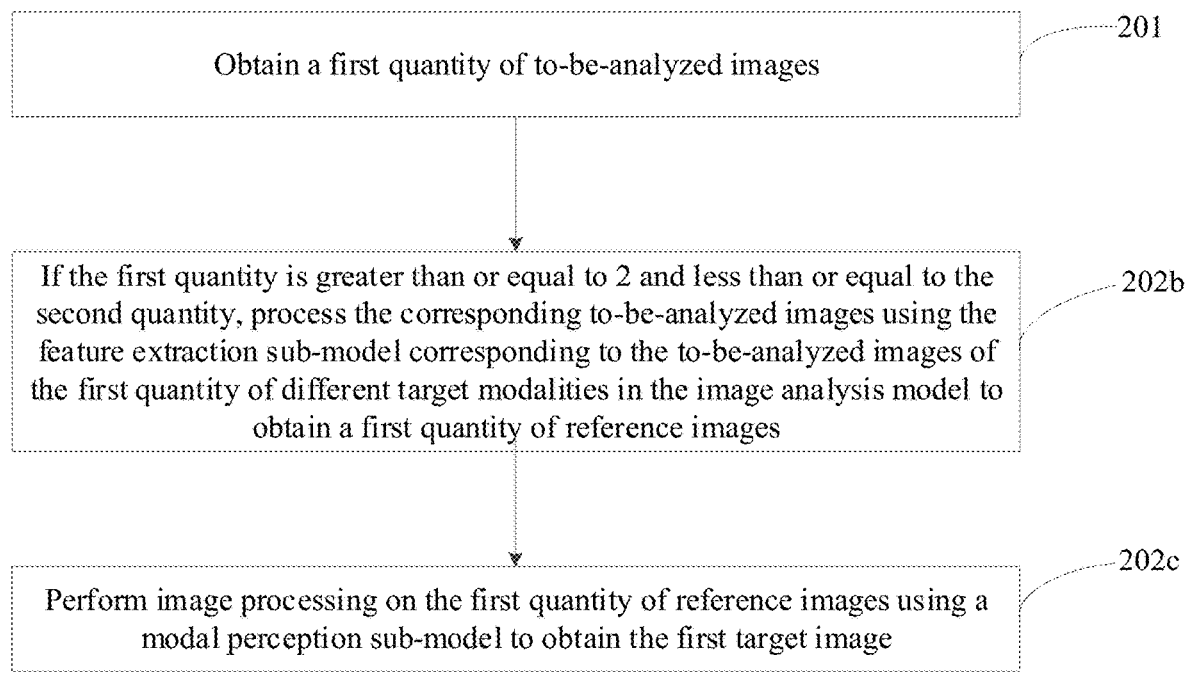
FIG. 3 illustrates a schematic flowchart of still another image processing method according to some embodiments of the present disclosure.

Based on the above embodiments, in other embodiments of the present disclosure, referring to FIG. 3, step 202 may include steps 202b to 202c.

At 202b, if the first quantity is greater than or equal to 2 and less than or equal to the second quantity, the corresponding images that need to be analyzed are processed using the feature extraction sub-model corresponding to the first quantity of images that need to be analyzed of different target modalities in the image analysis model to obtain a first quantity of reference images.

The feature extraction sub-model corresponding to each image that needs to be analyzed may represent a relationship between the images that need to be analyzed of the second quantity of different sample modalities.

In embodiments of the present disclosure, when the first quantity is greater than or equal to 2 and less than or equal to the second quantity, from the image analysis model, the feature extraction sub-model corresponding to the target modality of each image that needs to be analyzed may be determined. Then, the feature extraction sub-model corresponding to the target modality of each image that needs to be analyzed may be used to perform image feature extraction processing on the corresponding image that needs to be analyzed to obtain a feature image corresponding to each image that needs to be analyzed, that is, a reference image, to obtain the first quantity of reference images.

At 202c, image processing is performed on the first quantity of reference images using a modal perception sub-model to obtain the first target image.

In embodiments of the present disclosure, after the first quantity of reference images are obtained, the modality perception sub-model of the image analysis model may be used to perform the image processing on the first quantity of reference images to realize feature enhancement and image fusion processing to obtain the first target image.

Based on the above embodiments, in other embodiments of the present disclosure, the modal perception sub-model may be used to perform image fusion processing on reference images of at least two different modalities. In some other embodiments, the modal perception sub-model may be used to perform the image fusion processing after performing the feature enhancement processing on the reference images of the at least two different sample modalities.

In this embodiment of the present application, the modality perception sub-model in the image analysis model may directly perform image fusion processing on the first quantity of reference images, enhance representation of commonalities in the reference images, and weaken non-commonalities to obtain the first target image.

The modality perception sub-model in the image analysis model may further perform feature enhancement processing on the first quantity of reference images, and then perform image fusion processing on the first quantity of reference images after feature enhancement processing to obtain the first target image.

Based on the above embodiments, in other embodiments of the present disclosure, the modality perception sub-model is used to perform the image fusion processing after performing the feature enhancement processing on the reference images of the at least two different sample modalities. Step 202c may include steps a11 to a13.

At a11, the modal perception sub-model is used to perform the image fusion processing on the first quantity of reference images to obtain the target fusion image.

In embodiments of the present disclosure, the modal perception sub-model may be used to perform the image fusion processing on the first quantity of reference images extracted by the feature extraction sub-module to obtain the target fusion image.

At a12, the modal perception sub-model is used to determine a similarity coefficient between each reference image and the target fusion image to obtain a first quantity of similarity coefficients.

In embodiments of the present disclosure, after obtaining the target fusion image, the modal perception sub-model may be used to calculate the similarity coefficient between each reference image and the target fusion image to obtain the similarity coefficient corresponding to each reference image to obtain the first quantity of similarity coefficients. The modal perception sub-model may be used to calculate the similarity coefficient between each reference image and the target fusion image through similarity coefficient calculation methods, such as histogram matching method, hash algorithm, etc. The modal perception sub-model may also be used to calculate the similarity coefficient between each reference image and the target fusion image by using some neural network model algorithms.

When the modal perception sub-model uses the neural network model algorithm to calculate the similarity coefficient between each reference image and the target fusion image, the corresponding modal perception sub-model may be realized by at least two cascaded convolutional layers. In the at least two cascaded convolutional layers, an instance normalization layer and a leak rectified linear unit layer may be arranged after each convolutional layer before the last convolutional layer. When the modal perception sub-model is implemented by using two cascaded convolutional layers, a size of a convolution kernel of a first convolutional layer configured to process the first reference analysis image may be, for example, 3*3*3. A size of the convolution kernel of the second convolution layer configured to process a processing result of the leak rectified linear unit layer after a first convolution layer may be, for example, 1*1*1.

At a13, the modal perception sub-model is configured to perform feature enhancement processing on the first quantity of similarity coefficients and the first quantity of reference images to obtain the first target image.

In embodiments of the present disclosure, after determining and obtaining the similarity coefficient of each reference image, the modal perception sub-model may perform multiplication on the similarity coefficient of each reference image and each corresponding reference image. Thus, the modal perception sub-model may perform the feature enhancement processing on the corresponding reference image through each similarity coefficient to obtain the first target image.

Based on the above embodiments, in other embodiments of the present disclosure, step a13 may include steps a131 and a132.

At a131, the modal perception sub-model is configured to perform the feature enhancement processing on the similarity coefficient corresponding to each reference image to obtain a first quantity of sub-feature images.

In embodiments of the present disclosure, the modal perception sub-model may be configured to calculate a product between each reference image and the corresponding similarity coefficient. That is, the modal perception sub-model may be configured to perform weighting processing on each reference image to realize the feature enhancement processing for each reference image and obtain a sub-feature image corresponding to each reference image to obtain the first quantity of sub-feature images.

At a132, the modal perception sub-model is configured to perform image fusion processing on the first quantity of sub-feature images to obtain the first target image.

In embodiments of the present disclosure, the modal perception sub-model may be configured to perform superposition processing on the obtained first quantity of sub-feature images. That is, the modal perception sub-model may be configured to realize the image fusion processing to obtain the first target image.

Figure 4:
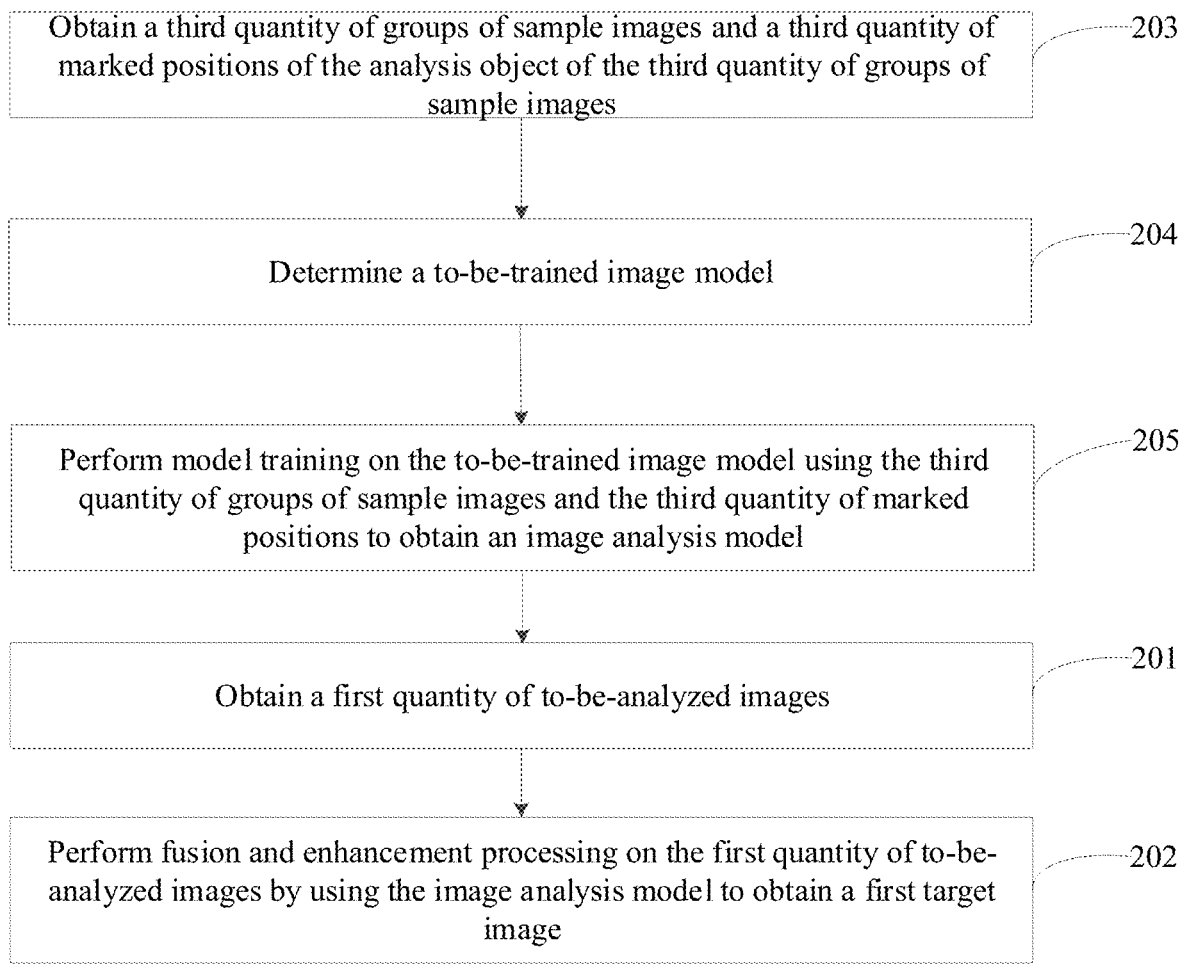
FIG. 4 illustrates a schematic flowchart of still another image processing method according to some embodiments of the present disclosure.

Based on the above embodiments, in other embodiments of the present disclosure, as shown in FIG. 4, before step 201, the electronic device is further configured to execute steps 203 to 205.

At 203, a third quantity of groups of sample images and a third quantity of marked positions of the analysis object of the third quantity of groups of sample images are obtained.

Each group of sample images may include a second quantity of sample images corresponding to different sample modalities.

In embodiments of the present disclosure, the third number may usually be a minimum number of samples required for model training. The marked position is the position of the analysis object in the sample image. Since each group of sample images are obtained by imaging a same imaging object in different sample modalities, in the same group of sample images, the analysis object may only have one marked position.

At 204, a image model that needs to be trained is determined.

At 205, model training is performed on the image model that needs to be trained using the third quantity of groups of sample images and the third quantity of marked positions to obtain an image analysis model.

In embodiments of the present disclosure, the third quantity of groups of sample images and the third quantity of marked positions may be used to perform the model training on the image model that needs to be trained to adjust and modify weight coefficients in the image model that needs to be trained. Thus, a loss value between the model obtained after the training and the corresponding marked position may be smaller than a predetermined threshold. Then, the model obtained after the training may be determined to be the image analysis model.

Steps 203 to 205 may also be implemented as an independent embodiment. That is, before step 201, steps 203 to 205 may be implemented as an independent embodiment. In the embodiment, the method may include performing the model training on the image model that needs to be trained to obtain the image analysis model. Thus, the trained image analysis model may be directly called subsequently.

Based on the above embodiments, in other embodiments of the present disclosure, step 205 may include steps 205a and 205b.

At 205a, the image model that needs to be trained is configured to perform fusion and enhancement processing on an area where the analysis object is located in the third quantity of groups of sample images to obtain the third quantity of second target images.

In embodiments of the present disclosure, for a specific implementation process of step 205a, reference may be made to steps 202b and 202c, steps a11 to a13, and steps a131 and a132, which is not described in detail here.

At 205b, based on the third quantity of groups of sample images, the third quantity of second target images, and the third quantity of marked positions, model training is performed on the image model that needs to be trained to obtain the image analysis model.

In embodiments of the present disclosure, the third quantity of groups of sample images, the third quantity of second target images, and a third quantity of marked positions may be used to perform the model training on the image model that needs to be trained to determine weight coefficients in the expected model that needs to be trained to obtain the image analysis model.

From the third quantity of groups of sample images, a group of sample images may be obtained in sequence to obtain the target group sample images. The image model that needs to be trained may be configured to perform fusion and enhancement processing on the target group sample images to obtain a second target image. Based on the target group sample images, the second target image corresponding to the target group sample images, and the marked positions corresponding to the target group sample images, the corresponding loss value may be calculated. If the loss value is less than a predetermined loss threshold, the loss value may be transferred reversely in the image model that needs to be trained to update the parameters in the image model that needs to be trained and update the image model that needs to be trained to a image model that needs to be trained after the parameters are updated. A next group of sample images adjacent to the target group sample images may be continued to be obtained from the third quantity of groups of sample images. The next group of sample images may be updated to be the target group sample images. In some other embodiments, a group of sample images may be obtained randomly from the third quantity of groups of sample images. The group of sample images may be updated to be the target group sample images. The process may repeat so on until the calculated loss value is less than the predetermined loss threshold. Then, the image model that needs to be trained corresponding to the predetermined loss threshold is the image analysis model.

Based on the above embodiments, in other embodiments of the present disclosure, step 205b may include steps b11 to b13.

At b11, a loss value between each sample image in the target group sample images and a corresponding marked position is determined to obtain a first loss value corresponding to the target group sample images.

The first loss value corresponding to the target group sample images may include a second quantity of loss values.

In embodiments of the present disclosure, a loss function may be used to calculate the loss value between each sample image of the target group sample images and the corresponding marked position to obtain the loss value of each sample image of the target group sample images. Thus, the first loss value corresponding to the target group sample images may be obtained.

At b12, the loss value between the second target image corresponding to the target group sample images and the corresponding marked position is determined to obtain a second loss value corresponding to the target group sample images.

In embodiments of the present disclosure, the loss function may be used to calculate the loss value between the second target image corresponding to the target group sample images and the corresponding marked position to obtain the second loss value corresponding to the target group sample images.

At b13, a first loss value corresponding to the target group sample images and a second loss value corresponding to the target group sample images are reversely transferred in the image model that needs to be trained to continuously train the parameters of the image model that needs to be trained to obtain the image analysis model.

In embodiments of the present disclosure, an accumulated sum of the first loss values corresponding to the target group sample images may be determined. A product of the accumulated sum and a predetermined weight coefficient may be calculated. A sum of the product and the second loss value corresponding to the target group sample images may be calculated. Thus, the loss value corresponding to the target group sample images may be obtained. If the loss value is less than or equal to the predetermined loss threshold, the corresponding image model that needs to be trained may be determined to be the image analysis model. If the loss value is greater than the predetermined loss threshold, the loss value may be reversely transferred to the image model that needs to be trained to update the parameters of the image model that needs to be trained to obtain a first image analysis model. The image model that needs to be trained may be updated to the first image analysis model. Operations corresponding to step 205a and steps b11 to b13 may be repeatedly performed until the image analysis model is obtained.

Figure 5:
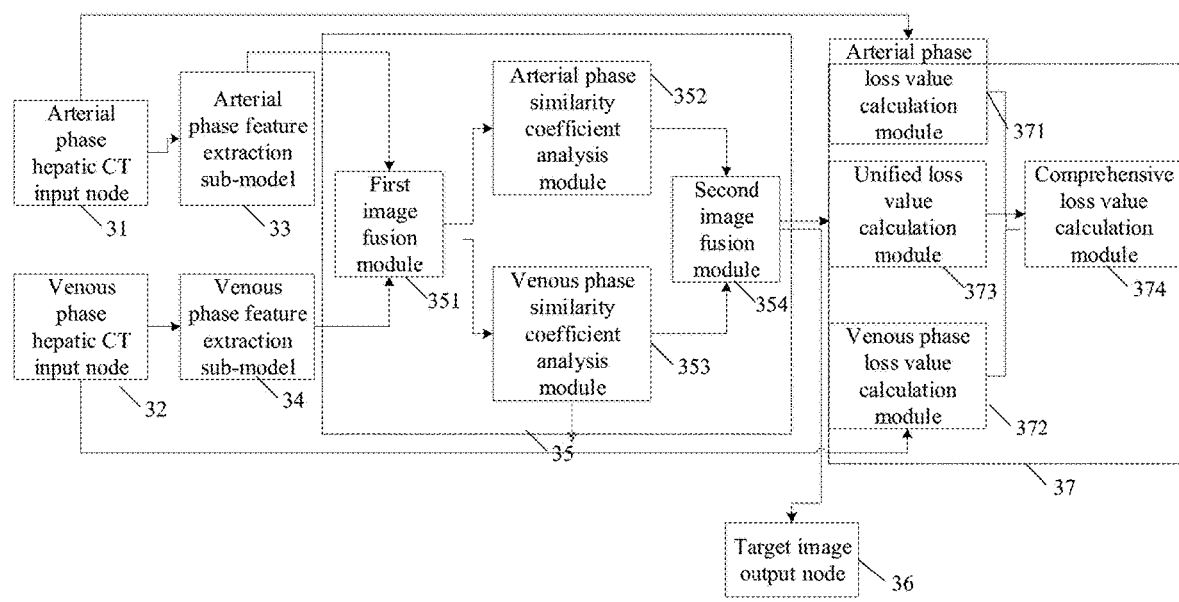
FIG. 5 illustrates a schematic structural diagram of a model according to some embodiments of the present disclosure.

Based on the above embodiments, embodiments of the present disclosure provide an implementation process of a method for performing image processing on a hepatic CT scan image. Correspondingly, as shown in FIG. 5, embodiments of the present disclosure provide a model structure when a image model that needs to be trained is trained. The model structure includes an arterial phase hepatic CT input node 31, a venous phase hepatic CT input node 32, an arterial phase feature extraction sub-model 33, a venous phase feature extraction sub-model 34, a modal perception sub-model 35, a target image output node 36, and a loss calculation node 37. The modal perception sub-model 35 includes a first image fusion module 351, an arterial phase similarity coefficient analysis module 352, a venous phase similarity coefficient analysis module 353, and a second image fusion module 354. The loss calculation node 37 includes an arterial phase loss value calculation module 371, a venous phase loss value calculation module 372, a joint loss value calculation module 373, and a comprehensive loss value calculation module 374.

In a model training phase, an example is taken to describe an information transfer process when a group of sample images, that is, the first arterial phase hepatic image and the first venous phase hepatic image of the same case, may be used to perform model training. The first arterial phase hepatic image may be input to the arterial phase hepatic CT input node 31. The first venous phase hepatic image may be input to the venous phase hepatic CT input node 32. The arterial phase hepatic CT input node 31 may be configured to send the first arterial phase hepatic image to the arterial phase feature extraction sub-model 33. The arterial phase feature extraction sub-model 33 may be configured to perform feature extraction on the first arterial phase hepatic image to obtain a first arterial phase reference image. Similarly, the venous phase feature extraction sub-model 34 may be configured to perform feature extraction on the first venous phase hepatic image to obtain a first venous phase reference image.

The first image fusion module 351 may be configured to perform image fusion processing on the first arterial phase reference image and the first venous phase reference image to obtain a first target fusion image. The arterial phase similarity coefficient analysis module 352 may be configured to perform similarity coefficient calculation on the first target fusion image and the first arterial phase reference image to obtain a first arterial similarity coefficient. Similarly, the venous phase similarity coefficient analysis module 353 may be configured to perform similarity coefficient calculation on the first target fusion image and the first venous phase reference image to obtain a first venous similarity coefficient. The second image fusion module 354 may be configured to perform feature enhancement processing on the first arterial phase reference image by using the first arterial similarity coefficient to obtain a first arterial sub-feature image. Similarly, the second image fusion module 354 may be configured to perform feature enhancement processing on the first venous phase reference image by using the first venous similarity coefficient to obtain the first venous sub-feature image.

Then, the second image fusion module 354 may be configured to perform image fusion processing on the first arterial sub-feature image and the first venous sub-feature image to obtain the first target image. The arterial phase loss value calculation module 371 may be configured to calculate a first arterial phase loss value $L1=L_{intra}(Y|X_{ap}; W_{ap})$ based on the first arterial phase hepatic image $X_{ap}$ and a hepatic tumor marked position Y. $W_{ap}$ is a corresponding parameter coefficient of the arterial feature extraction sub-model 33 and the arterial phase similarity coefficient analysis module 352 in the model that needs to be trained. Similarly, the venous phase loss value calculation module 372 may be configured to calculate a first venous loss value $L2=L_{intra}(Y|X_{vp}; W_{vp})$ based on the first venous phase hepatic image $X_{vp}$ and the hepatic tumor marked position Y. $W_{vp}$ is the corresponding parameter coefficient of the venous phase feature extraction sub-model 34 and the venous phase similarity coefficient analysis module 353 in the model that needs to be trained. The joint loss value calculation module 373 may be configured to calculate a first joint loss value $L3=L_{joint}(Y|X;W)$, $W=\{W_{ap}, W_{vp}\}$ based on a first target image X and the hepatic tumor marked position Y. The comprehensive loss value module 374 may be configured to calculate a final loss value through the following formula.

$$L=\lambda(L1+L2)+L3=\lambda\Sigma_{i=ap,vp}L_{intra}(Y|X_i;W_i)+L_{joint}(Y|X;W)$$

If the final loss value is greater than the predetermined loss threshold, the final loss value may be reversely transferred to the model that needs to be trained shown in FIG. 5. Parameters of the arterial phase feature extraction sub-model 33, the venous phase feature extraction sub-model 34, and the modal perception sub-model 35 may be updated. Then, the updated model that needs to be trained shown in FIG. 5 may repeat the above process until the trained final loss value is determined to be smaller than or equal to the predetermined loss threshold. Then, the corresponding model that needs to be trained may be determined to be the image analysis model.

The arterial phase feature extraction sub-model 33 and the venous phase feature extraction sub-model 34 may both be implemented by using a full convolution network (FCN).

A process of determining the similarity coefficient by the arterial phase similarity coefficient analysis module 352 and the venous phase similarity coefficient analysis module 353 may be represented by the following formula:

$$A_i=\delta(f_a([F_{dual},F_i];\theta_i)), i=ap,vp,$$

Where $\delta$ denotes a sigmoid function, $\theta$ denotes a parameter learned by $f_a$, which consists of two cascaded convolution layers. A first convolution layer may include a 3×3×3 convolution kernel, and a second convolutional layer may include a 1×1×1 convolution kernel. Each convolution layer is followed by an instance normalization and a leaky rectified linear unit. $F_{dual}$ denotes the first target fusion image, $F_{ap}$ denotes a first arterial phase reference image, the $F_{vp}$ denotes a first venous phase reference image, $A_{ap}$ denotes the first arterial phase similarity coefficient, and $A_{vp}$ denotes the first venous phase similarity coefficient. A convolution operation may be used to model a correlation between discriminative dual-modal information and each modal feature.

An implementation process of the second image fusion module 354 may be represented by the following formula:

$$F_{att} = \Sigma_{i=ap,vp} A_i * F_i = A_{ap} * F_{ap} + A_{vp} * F_{vp},$$

where $A_{ap}$ denotes the first arterial similarity coefficient, $A_{vp}$ denotes the first venous similarity coefficient, $F_{ap}$ denotes the first arterial phase reference image, and $F_{vp}$ denotes the first venous phase reference image.

As such, the first image fusion module 351 may obtain the first target fusion image through convolution. Although the first target fusion image includes the arterial information and venous information of the hepatic tumor, the first target fusion image also inevitably introduces redundant noise of each sample modality when the hepatic tumor is segmented. In order to reduce the redundant noise, the venous phase similarity coefficient analysis module 353 and the arterial phase similarity coefficient analysis module 352 are provided to calculate influence of each sample modality through an attention mechanism. Thus, contribution of each sample modality may be measured adaptively and interpreted visually. Further, in a process of calculating the final loss value, the arterial phase loss value calculation module 371 may encourage each branch to learn to distinguish specific arterial phase features. The venous phase loss value calculation module 372 may encourage each branch to learn to distinguish the specific venous phase features. The joint loss value calculation module 373 may encourage each branch to learn from each other to maintain commonalities between high-level features to better combine multi-modal information. As such, the model training may be performed through the above loss value determination method. Thus, a combination of cross entropy loss and slice loss may be used as a segmentation loss, which effectively reduces influence of an uneven distribution of tumor data.

Assuming that the image analysis model may be obtained after model training is performed according to the image model that needs to be trained shown in FIG. 5. The first quantity of images that need to be analyzed may be 1. In some embodiments, when the to-be-analyzed image is the to-be-analyzed second arterial phase hepatic image, correspondingly, the second arterial phase hepatic image may be input to the arterial phase feature extraction sub-model 33 through the arterial phase hepatic CT input node 31. The arterial phase feature extraction sub-model 33 may be configured to perform feature extraction on the second arterial phase hepatic image to obtain the second arterial phase reference image. Since a missing part exists in the venous phase hepatic image, the second arterial phase reference image may be directly output from the target image output node 36. That is, the first target image corresponding to the second arterial phase hepatic image may be obtained. When the image that needs to be analyzed is a to-be-analyzed second venous phase hepatic image, for the implementation process, reference may be made to the implementation process of the image that needs to be analyzed being the to-be-analyzed second arterial phase hepatic image, which is not be repeated here.

Figure 6:
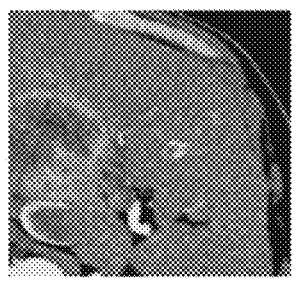
FIG. 6 illustrates a schematic diagram of an arterial phase liver image according to some embodiments of the present disclosure.
Figure 7:
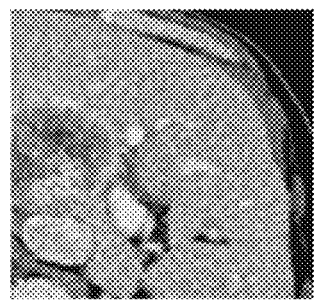
FIG. 7 illustrates a schematic diagram of a venous phase liver image according to some embodiments of the present disclosure.

When the first quantity is equal to the second quantity 2, and the images that need to be analyzed include a third arterial phase hepatic image as shown in FIG. 6 and a third venous phase hepatic image as shown in FIG. 7, the third arterial phase hepatic image may be input to the arterial phase hepatic CT input node 31, and the third venous phase hepatic image may be input to the venous phase hepatic CT input node 32. The arterial phase hepatic CT input node 31 may be configured to send the third arterial phase hepatic image to the arterial phase feature extraction sub-model 33. The arterial phase feature extraction sub-model 33 may be configured to perform feature extraction on the third arterial phase hepatic image to obtain a third arterial phase reference image. Similarly, the venous phase feature extraction sub-model 34 may perform feature extraction on the third venous phase hepatic image to obtain the third venous phase reference image.

Figure 8:
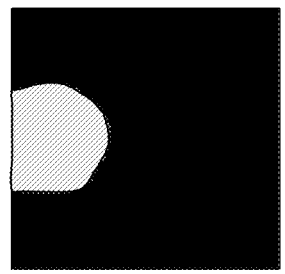
FIG. 8 illustrates a schematic diagram of a first target image according to some embodiments of the present disclosure.

The first image fusion module 351 may be configured to perform image fusion processing on the third arterial phase reference image and the third venous phase reference image to obtain a second target fusion image. The arterial phase similarity coefficient analysis module 352 may be configured to perform similarity coefficient calculation on the second target fusion image and the third arterial phase reference image to obtain a second arterial similarity coefficient. Similarly, the venous phase similarity coefficient analysis module 353 may be configured to perform similarity coefficient calculation on the second target fusion image and the third venous phase reference image to obtain a second venous similarity coefficient. The second image fusion module 354 may be configured to perform feature enhancement processing on the third arterial phase reference image by using the second arterial similarity coefficient to obtain a second arterial sub-feature image. Similarly, the second image fusion module 354 may be configured to perform feature enhancement processing on the third venous phase reference image by using the second venous similarity coefficient to obtain a second venous sub-feature image. Then, the second image fusion module 354 may be configured to perform image fusion processing on the second arterial sub-feature image and the second venous sub-feature image to obtain the first target image corresponding to the third arterial phase hepatic image and the third venous phase hepatic image. As shown in FIG. 8, the first target image corresponding to the third arterial phase hepatic image and the third venous phase hepatic image may be output through the target image output node 36. An oblique filled area in FIG. 8 is the highlighted hepatic tumor area.

As such, the obtained image analysis model may process a multi-modal segmentation problem and a missing modality problem without any modification, which improves the processing efficiency. Each model of a single modality may use the dual-modal information implicitly by learning from other models. That is, since the parameters of the arterial phase feature extraction sub-model and the venous phase feature extraction sub-model are determined by the dual-modal information, when another modality is missing, according to the parameters of the arterial phase feature extraction sub-model or the venous phase feature extraction sub-model a better segmentation result may be obtained. That is, by combining the features and commonalities of the modalities, through the cooperation of all specific modal models, a better multi-modal segmentation effect may be obtained.

For the description of the same step and the same content of embodiments of the present disclosure, reference may be made to the descriptions in other embodiments, which is not repeated here.

Embodiments of the present disclosure provide an image processing method. The method includes obtaining a first quantity of images that need to be analyzed and performing fusion and enhancement processing on the first quantity of images that need to be analyzed to obtain a first target image. As such, since the first quantity is less than a second quantity of all inputs of the image analysis model, the fusion and enhancement processing may be performed on the first quantity of images that need to be analyzed with missing modality through the image analysis model to obtain the first target image for the analysis object. Thus, a problem that image analysis may not be realized when the modality is missing in the current image processing method may be solved. When the modality is missing, the unified image processing method may be still be used to perform analysis, which improves the processing efficiency of the image processing method.

Figure 9:
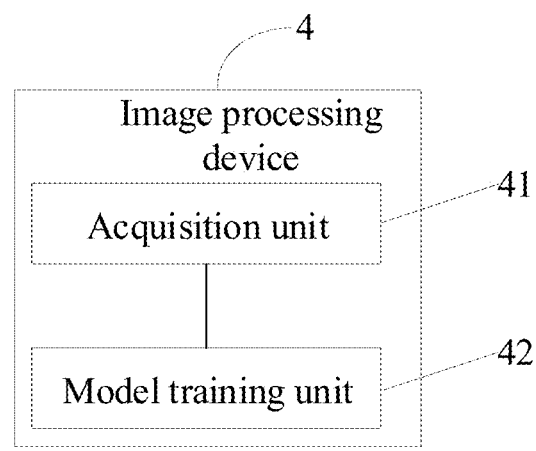
FIG. 9 illustrates a schematic structural diagram of an image processing device according to some embodiments of the present disclosure.

Based on the above embodiments, embodiments of the present disclosure provide an image processing apparatus 4. As shown in FIG. 9, the image processing apparatus 4 includes an acquisition unit 41 and a model processing unit 42.

The acquisition unit 41 may be configured to obtain a first quantity of images that need to be analyzed. Each image that needs to be analyzed may correspond to a different target modality of the target imaging object.

The model processing unit 42 may be configured to perform fusion and enhancement processing on the first quantity of images that need to be analyzed through the image analysis model to obtain the first target image. The first target image may be used to enhance the display of the distribution area of the analysis object of the first quantity of images that need to be analyzed. The analysis object may belong to the imaging object. The image analysis model may be obtained by training the second quantity of sample images corresponding to the different sample modalities. The first quantity may be less than or equal to the second quantity. The target modal may belong to the sample modal.

Based on the above embodiments, in other embodiments of the present disclosure, the model processing unit 42 includes a feature extraction sub-model module.

The feature extraction sub-model module may be configured to, if the first quantity is 1, based on the feature extraction sub-models corresponding to the first quantity of images that need to be analyzed of different target modalities in the image analysis model, process the corresponding images that need to be analyzed to obtain the first target image. The feature extraction sub-model corresponding to each image that needs to be analyzed may represent an association relationship between the images that need to be analyzed of the second quantity of different sample modalities.

Based on the above embodiments, in other embodiments of the present disclosure, the model processing unit 42 includes a feature extraction sub-model module and a modal perception sub-model module.

The feature extraction sub-model module may be configured to, if the first quantity is greater than or equal to 2, and less than or equal to the second quantity, through the feature extraction sub-model corresponding to the first quantity of images that need to be analyzed of different target modalities in the image analysis model, process the corresponding images that need to be analyzed to obtain the first quantity of reference images. The feature extraction sub-model corresponding to each image that needs to be analyzed may represent the association relationship between the images that need to be analyzed of the second quantity of different sample modalities.

The modal perception sub-model module may be configured to perform image processing on the first quantity of reference images through the modal perception sub-model of the image analysis model to obtain the first target image.

Based on the above embodiments, in other embodiments of the present disclosure, the modal perception sub-model may be configured to perform image fusion processing on reference images of at least two different modalities. In some other embodiments, the modal perception sub-model may be configured to perform feature enhancement processing on reference images of at least two different sample modalities to perform image fusion processing.

Based on the above embodiments, in other embodiments of the present disclosure, after the modal perception sub-model is configured to perform the feature enhancement processing on the reference images of the at least two different sample modalities, the modal perception sub-model may be configured to perform the image fusion processing. The modal perception sub-model may be configured to perform image fusion processing on the first quantity of reference images to obtain the target fusion image, determine the similarity coefficient between each reference image and the target fusion image to obtain the first quantity of similarity coefficients, and perform the feature enhancement processing on the first quantity of similarity coefficients and the first quantity of reference images to obtain the first target image.

Based on the above embodiments, in other embodiments of the present disclosure, the modal perception sub-model may be configured to perform the feature enhancement processing on the first quantity of similarity coefficients and the first quantity of reference images to obtain the first target image. The modal perception sub-model may implement the above process by performing the feature enhancement processing on each reference image using the corresponding similarity coefficient to obtain the first quantity of sub-feature images and performing the image fusion processing on the first quantity of sub-feature images to obtain the first target image.

Based on the above embodiments, in other embodiments of the present disclosure, the image processing apparatus further includes a determination unit and a model training unit.

The acquisition unit may be further configured to obtain a third quantity of groups of sample images and a third quantity of marked positions for the analysis object in the third quantity of groups of sample images and of marked positions for the analysis object. Each group of sample images may include a second quantity of sample images corresponding to different sample modalities.

The determination unit may be configured to determine the image model that needs to be trained.

The model training unit may be configured to perform model training on the image model that needs to be trained using the third quantity of groups of sample images and the third quantity of marked positions to obtain the image analysis model.

Based on the above embodiments, in other embodiments of the present disclosure, the model training unit may be configured to, through the image model that needs to be trained, perform fusion and enhancement processing on the area where the analysis object is located in the third quantity of groups of sample images to obtain a third quantity of second target images and perform the model training on the image model that needs to be trained based on the third quantity of groups of sample images, the third quantity of second target images, and the third quantity of marked positions.

Based on the above embodiments, in other embodiments of the present disclosure, the model training unit may be configured to perform the model training on the image model that needs to be trained based on the third quantity of groups of sample images, the third quantity of second target images, and the third quantity of marked positions to obtain the image analysis model. The model training unit may be configured to implement the above process by the following steps.

The loss value between each sample image in the target group sample images and the corresponding marked position may be determined to obtain the first loss value corresponding to the target group sample images. The first loss value corresponding to the target group sample images may include a second quantity of loss values.

The loss value between the second target image corresponding to the target group sample images and the corresponding marked position may be determined to obtain the second loss value corresponding to the target group sample images.

The first loss value corresponding to the target group sample images and the second loss value corresponding to the target group sample images may be reversely transferred in the image model that needs to be trained to continuously train the parameters of the image model that needs to be trained to obtain the image analysis model.

For an information exchange process and description between the units and modules of embodiments of the present disclosure, reference may be made to the interaction process in the image processing method shown in FIGS. 1 to 4, which is not repeated here.

Embodiments of the present disclosure provide an image processing apparatus. After obtaining the first quantity of images that need to be analyzed, the image processing apparatus may be configured to perform fusion and enhancement processing on the first quantity of images that need to be analyzed through the image analysis model to obtain the first target image. As such, since the first quantity may be less than the second quantity of all inputs of the image analysis model, the image processing apparatus may be configured to perform fusion and enhancement processing on the first quantity of images that need to be analyzed with the missing modalities through the image analysis model to obtain the first target for the analysis object. Thus, the problem that the current image processing method cannot analyze the image when the modality is missing may be solved. Therefore, when the modality is missing, the unified image processing method may be still used to perform the analysis to improve the processing efficiency of the image processing method.

Figure 10:
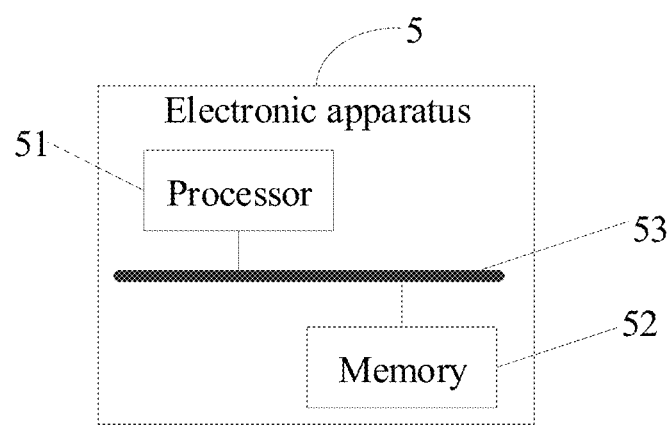
FIG. 10 illustrates a schematic structural diagram of an electronic apparatus according to some embodiments of the present disclosure.

Based on the above embodiments, embodiments of the present disclosure provide an electronic device. The electronic device may be applied to the image processing methods of embodiments corresponding to FIGS. 1 to 4. As shown in FIG. 10, the electronic device 5 includes a processor 51, a memory 52, and a communication bus 53.

The communication bus 53 may be configured to realize a communication connection between the processor 51 and the memory 52.

The processor 51 may be configured to execute an image processing program stored in the memory 52 to implement the implementation processes of the image processing method of embodiments corresponding to FIGS. 1 to 4, which is not repeated here.

Based on the above embodiments, embodiments of the present disclosure provide a computer-readable storage medium, that is a storage medium. The computer-readable storage medium can be applied to the methods provided by embodiments corresponding to FIGS. 1 to 4. The computer-readable storage medium may store one or more programs. The one or more programs may be executed by one or more processors to implement the method implementation processes of embodiments corresponding to FIGS. 1 to 4, which is not repeated here.

Those skilled in the art should understand that embodiments of the present disclosure may be provided as a method, a system, or a computer program product. Thus, the present disclosure may take the form of a hardware embodiment, a software embodiment, or an embodiment combining software and hardware aspects. Furthermore, the present disclosure may take the form of a computer program product implemented on one or more computer-usable storage media (including but not limited to disk storage, optical storage, etc.) having computer-usable program codes.

The present disclosure is described with reference to flowcharts and/or block diagrams of methods, apparatuses (systems), and computer program products of embodiments of the present disclosure. Each process and/or block in the flowcharts and/or block diagrams and a combination of each process and/or block in the flowcharts and/or block diagrams may be implemented by the computer program instructions. These computer program instructions may be provided to a processor of a general-purpose computer, a special purpose computer, an embedded processor, or another programmable data processing device to produce a machine such that the instructions executed by the processor of the computer or another programmable data processing device may be used to produce an apparatus configured to realize a function specified by a flow or flows of the flowchart and/or a block or blocks of a block diagram.

These computer program instructions may also be stored in a computer-readable memory capable of directing a computer or another programmable data processing apparatus to function in a particular manner. Thus, the instructions stored in the computer-readable memory generate an article comprising an instruction device. The instruction device implements the functions specified in the flow or flows of the flowcharts and/or the block or blocks of the block diagrams.

These computer program instructions may also be loaded on a computer or other programmable data processing apparatus to cause a series of operational steps to be performed on the computer or the other programmable device to produce a computer-implemented process. Thus, the instructions provide steps for implementing the function specified in the flow or flows of the flowcharts and/or the block or blocks of the block diagrams.

The present specification only describes some embodiments of the present disclosure and is not intended to limit the scope of the present disclosure.

What is claimed is:

1. An image processing method comprising:
    obtaining a first quantity of to-be-analyzed images, each to-be-analyzed image corresponding to a different target modality of a target imaging object;
    performing fusion and enhancement processing on the first quantity of to-be-analyzed images through an image analysis model to obtain a first target image, the first target image being used to enhance display of a distribution area of an analysis object of the first quantity of to-be-analyzed images, the analysis object belonging to the target imaging object, the image analysis model being obtained by training a second quantity of sample images corresponding to different sample modalities, the first quantity being less than or equal to the second quantity, and the target modality belonging to the sample modalities, including:
  in response to the first quantity being greater than or equal to 2 and less than or equal to the second quantity, processing the corresponding to-be-analyzed images using feature extraction sub-models to obtain a first quantity of reference images, the feature extraction sub-models corresponding to the first quantity of to-be-analyzed images of different target modalities in the image analysis model, a feature extraction sub-model corresponding to each to-be-analyzed image representing an association relationship between a second quantity of to-be-analyzed images of different sample modalities; and
  processing the first quantity of reference images through a modal perception sub-model of the image analysis model to obtain the first target image.

2. The method according to claim 1, wherein performing the fusion and enhancement processing on the first quantity of to-be-analyzed images through the image analysis model to obtain the first target image includes:
  in response to the first quantity being 1, processing the corresponding to-be-analyzed images based on the feature extraction sub-models to obtain the first target image.

3. The method according to claim 1, wherein the modal perception sub-model is configured to:
  perform image fusion processing on reference images of at least two different modalities; or
  perform image fusion processing after performing feature enhancement processing on the reference images of the at least two different modalities.

4. The method according to claim 3, when the modal perception sub-model is configured to perform image fusion processing after performing feature enhancement processing on the reference images of the at least two different modalities, performing image processing on the first quantity of reference images through the modal perception sub-model of the image analysis model to obtain the first target image includes:
  performing image fusion processing on the first quantity of reference images by using the modal perception sub-model to obtain a target fusion image;
  determining a similarity coefficient between each reference image of the reference images and the target fusion image by using the modal perception sub-model to obtain a first quantity of the similarity coefficients; and
  performing feature enhancement processing on the first quantity of similarity coefficients and the first quantity of reference images through the modal perception sub-model to obtain the first target image.

5. The method according to claim 4, wherein performing feature enhancement processing on the first quantity of similarity coefficients and the first quantity of reference images through the modal perception sub-model to obtain the first target image includes:
  performing feature enhancement processing on each reference image of the reference images using a corresponding similarity coefficient through the modal perception sub-model to obtain a first quantity of sub-feature images; and
  performing image fusion processing on the first quantity of sub-feature images through the modal perception sub-model to obtain the first target image.

6. The method according to claim 1, further comprising:
  obtaining a third quantity of groups of sample images and a third quantity of marked positions for the analysis object in the third quantity of groups of sample images, each group of sample images including the second quantity of sample images corresponding to the different sample modalities;
  determining an image model; and
  performing model training on the image model using the third quantity of groups of sample images and the third quantity of marked positions to obtain the image analysis model.

7. The method according to claim 6, wherein performing the model training on the image model using the third quantity of groups of sample images and the third quantity of marked positions to obtain the image analysis model includes:
  through the image model, performing fusion and enhancement processing on an area where the analysis object is located in the third quantity of groups of sample images to obtain a third quantity of second target images; and
  based on the third quantity of groups of sample images, the third quantity of second target images, and the third quantity of marked positions, performing model training on the image model to obtain the image analysis model.

8. The method of claim 7, wherein based on the third quantity of groups of sample images, the third quantity of second target images, and the third quantity of marked positions, performing the model training on the image model to obtain the image analysis model includes:
  determining a loss value between each sample image of target group sample images and a corresponding marked position to obtain a first loss value corresponding to the target group sample images, the first loss value corresponding to the target sample images including a second quantity of loss values;
  determining a loss value between a second target image corresponding to the target group sample images and a corresponding marked position to obtain a second loss value corresponding to the target group sample images; and
  transferring the first loss value corresponding to the target group sample images and the second loss value corresponding to the target group sample images reversely in the image model to continuously train parameters of the image model to obtain the image analysis model.

9. An image processing device comprising:
  an acquisition unit, configured to obtain a first quantity of to-be-analyzed images, each to-be-analyzed image corresponding to a different target modality of a target imaging object; and
  a model processing unit, configured to perform fusion and enhancement processing on the first quantity of to-be-analyzed images through an image analysis model to obtain a first target image, the first target image being used to enhance display of a distribution area of an analysis object of the first quantity of to-be-analyzed images, the analysis object belonging to the target imaging object, the image analysis model being obtained by training a second quantity of sample images corresponding to different sample modalities, the first quantity being less than or equal to the second quantity, and the target modality belonging to the sample modalities, including:

in response to the first quantity being greater than or equal to 2 and less than or equal to the second quantity, processing the corresponding to-be-analyzed images using feature extraction sub-models to obtain a first quantity of reference images, the feature extraction sub-models corresponding to the first quantity of to-be-analyzed images of different target modalities in the image analysis model, a feature extraction sub-model corresponding to each to-be-analyzed image representing an association relationship between a second quantity of to-be-analyzed images of different sample modalities; and processing the first quantity of reference images through a modal perception sub-model of the image analysis model to obtain the first target image.

10. The device according to claim 9, wherein the model processing unit is further configured to:
in response to the first quantity being 1, process the corresponding to-be-analyzed images based on feature extraction sub-models to obtain the first target image.

11. The device according to claim 9, wherein the modal perception sub-model is configured to:
perform image fusion processing on reference images of at least two different modalities; or
perform image fusion processing after performing feature enhancement processing on the reference images of the at least two different modalities.

12. The device according to claim 11, when the modal perception sub-model is configured to perform image fusion processing after performing feature enhancement processing on the reference images of the at least two different modalities, the model processing unit is further configured to:
perform image fusion processing on the first quantity of reference images by using the modal perception sub-model to obtain a target fusion image;
determine a similarity coefficient between each reference image of the reference images and the target fusion image by using the modal perception sub-model to obtain a first quantity of the similarity coefficients; and
perform feature enhancement processing on the first quantity of similarity coefficients and the first quantity of reference images through the modal perception sub-model to obtain the first target image.

13. The device according to claim 12, wherein the model processing unit is further configured to:
perform feature enhancement processing on each reference image of the reference images using a corresponding similarity coefficient through the modal perception sub-model to obtain a first quantity of sub-feature images; and
perform image fusion processing on the first quantity of sub-feature images through the modal perception sub-model to obtain the first target image.

14. The device according to claim 9,
wherein the acquisition unit is further configured to obtain a third quantity of groups of sample images and a third quantity of marked positions for the analysis object in the third quantity of groups of sample images, each group of sample images including the second quantity of sample images corresponding to the different sample modalities;

further comprising:
a determination unit, configured to determine an image model; and
a model training unit, configured to perform model training on the image model using the third quantity of groups of sample images and the third quantity of marked positions to obtain the image analysis model.

15. The device according to claim 14, wherein the model training unit is further configured to:
through the image model, perform fusion and enhancement processing on an area where the analysis object is located in the third quantity of groups of sample images to obtain a third quantity of second target images; and
based on the third quantity of groups of sample images, the third quantity of second target images, and the third quantity of marked positions, perform model training on the image model to obtain the image analysis model.

16. The device of claim 15, wherein the model training unit is further configured to:
determine a loss value between each sample image of target group sample images and a corresponding marked position to obtain a first loss value corresponding to the target group sample images, the first loss value corresponding to the target sample images including a second quantity of loss values;
determine a loss value between a second target image corresponding to the target group sample images and a corresponding marked position to obtain a second loss value corresponding to the target group sample images; and
transfer the first loss value corresponding to the target group sample images and the second loss value corresponding to the target group sample images reversely in the image model to continuously train parameters of the image model to obtain the image analysis model.

17. A non-transitory computer-readable storage medium storing a program that, when executed by a processor, causes the processor to:
obtain a first quantity of to-be-analyzed images, each to-be-analyzed image corresponding to a different target modality of a target imaging object;
perform fusion and enhancement processing on the first quantity of to-be-analyzed images through an image analysis model to obtain a first target image, the first target image being used to enhance display of a distribution area of an analysis object of the first quantity of to-be-analyzed images, the analysis object belonging to the target imaging object, the image analysis model being obtained by training a second quantity of sample images corresponding to different sample modalities, the first quantity being less than or equal to the second quantity, and the target modality belonging to the sample modalities, including:
in response to the first quantity being greater than or equal to 2 and less than or equal to the second quantity, processing the corresponding to-be-analyzed images using feature extraction sub-models to obtain a first quantity of reference images, the feature extraction sub-models corresponding to the first quantity of to-be-analyzed images of different target modalities in the image analysis model, a feature extraction sub-model corresponding to each to-be-analyzed image representing an association relationship between a second quantity of to-be-analyzed images of different sample modalities; and processing the first quantity of reference images through a modal perception sub-model of the image analysis model to obtain the first target image.

18. The non-transitory computer-readable storage medium according to claim 17, wherein the processor is further caused to:
in response to the first quantity being 1, process the corresponding to-be-analyzed images based on feature extraction sub-models to obtain the first target image.

* * * * *